2,847,423
Patented Aug. 12, 1958

2,847,423

PREPARATION OF 3-ACETYL-4-HYDROXY-COUMARIN

Richard Norman Lacey, Hull, England, assignor to The Distillers Company Limited, Edinburgh, Scotland, a British company No Drawing. Application September 17, 1954
Serial No. 456,871

Claims priority, application Great Britain
September 25, 1953

4 Claims. (Cl. 260—343.2)

The present invention relates to a process for the production of 3-acetyl-4-hydroxycoumarin which is a valuable intermediate for the production of pharmaceuticals, such as the blood anti-coagulants 3:3′-methylenebis-(4-hydroxycoumarin) and bis-(4-hydroxycoumarin) ethyl acetate, and also for the production of 3-(alpha-acetonylbenzyl) 4-hydroxycoumarin which is used as a rodenticide.

3-acetyl-4-hydroxycoumarin has been prepared by a number of different methods but most of these suffer from the disadvantage of either starting from not readily available materials or of employing metallic sodium which is an undesirable material on the large scale. It has, however, been suggested to react acetylsalicyl chloride with ethyl acetoacetate in aqueous sodium hydroxide solution at 0–10° C. However, it was only by using a large excess of ethyl acetoacetate that satisfactory yields were obtained. Thus considerable quantities of ethyl acetoacetate were lost owing to hydrolysis during the course of the reaction, and recovery of any unchanged ester was difficult if not impossible.

According to the present invention, the process for the production of 3-acetyl-4-hydroxycoumarin comprises interacting acetylsalicylyl chloride with the calcium derivative of an acetoacetic ester of a lower primary or secondary alkanol, cyclising the resulting intermediate compound with aqueous alkali metal hydroxide solution and liberating the 3-acetyl-4-hydroxycoumarin from its alkali metal salt by acidification.

The reactions of the process according to the invention are believed to take place according to the equations:

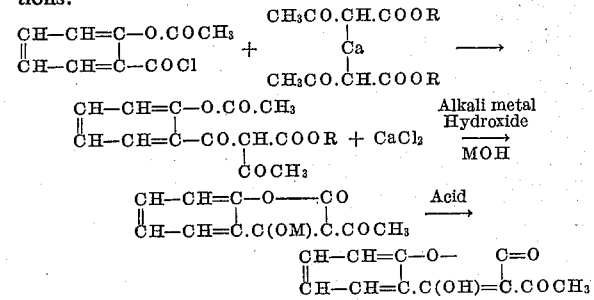

where R represents a lower primary or secondary alkyl group containing up to 6 carbon atoms and M represents an alkali metal.

It is preferred to carry out the reaction of the acetylsalicylyl chloride with the calcium derivative of the acetoacetic ester in an inert solvent. Examples of suitable solvents are for instance benzene and carbon tetrachloride but other hydrocarbons and chorinated hydrocarbons as well as many other inert solvents may be used. Furthermore on account of their greater solubility in common solvents, it is preferred to use the calcium derivatives of acetoacetic esters of primary or secondary alkanols having from three to six carbon atoms. The calcium derivative of n-butyl acetoacetate has been found to be particularly suitable since at least one gram mole will dissolve in 500 mls. of benzene at room temperature. However, the calcium derivative of the isopropyl ester is also useful while the calcium derivatives of the primary or secondary amyl or hexyl esters may also be used. It is unnecessary to use a large excess of the calcium derivative of the ester, although a small excess, for instance 10%–20% theoretical excess is desirable. With a theoretical excess of 10%, high yields of the coumarin derivative based on each of the starting materials are obtainable.

The acetylsalicyl chloride used for the process may be either the pure material or the crude material containing aluminium trichloride prepared according to copending application Serial No. 454,635, filed September 7, 1954, which relates to the production of a mixture containing acetylsalicylyl chloride by reacting acetylsalicylic acid with thionyl chloride in the presence of aluminium trichloride. The calcium derivative of the acetoacetic ester may be prepared by adding a slight theoretical excess, for instance a 10% to 50% theoretical excess, of calcium oxide to the ester dissolved in a suitable solvent such as benzene or carbon tetrachloride and, after initial reaction has subsided, refluxing the mixture under a decanter head to remove the water of reaction. After removing the excess lime, for instance by filtration or decantation, the solvent solution of the calcium derivative may be used directly in the process of the invention.

The reaction of the acetylsalicyl chloride with the calcium derivative of the acetoacetic ester is vigorous and it is convenient to add one of the reactants to a solution of the other in an inert solvent, preferably one boiling at a temperature between 50° and 100° C. so that the reaction can be carried out under refluxing conditions over a period of at least 10 minutes. It is immaterial which reactant is added to the other. The reaction is rapid and precipitation of calcium chloride takes place within a few minutes. However, it is advisable to continue the heating for a period of 1 to 2 hours.

The cyclisation of the intermediate compound with aqueous alkali metal hydroxide solution is preferably carried out after removal of the calcium chloride from the reaction mixture but it is unnecessary to isolate the intermediate compound in a state of purity. The removal of the calcium chloride may be conveniently effected by extraction with water. Following removal of the calcium chloride solution any solvent should be removed preferably by evaporation under reduced pressure.

The cyclisation of the intermediate compound which is believed to be the alpha-acetylsalicylacetoacetic ester, may conveniently be effected with dilute aqueous sodium hydroxide solution, for instance of 10% by weight concentration, at normal or slightly elevated temperatures. A reaction period of two hours is sufficient at 20° C.; as the cyclisation proceeds, the solid alkali metal salt of 3-acetyl-4-hydroxycoumarin is deposited. The cyclisation may also be effected with another dilute alkali metal hydroxide solution, such for example as potassium hydroxide.

On completion of the cyclisation, the free 3-acetyl-4-hydroxycoumarin may be liberated from the sodium salt by acidification, for instance with concentrated hydrochloric acid or 10% weight/volume aqueous sulphuric acid. Since the product is quite a strong acid, it is necessary to add the mineral acid in sufficient quantity to react with all the alkali used in the previous step; bromophenol blue is a convenient indicator. The 3-acetyl-4-hydroxycoumarin may then be filtered off and washed first with water and finally with a solvent such as methanol to remove adhering oily impurities.

The following examples illustrate the way in which the invention may be carried out in practice.

EXAMPLE 1

*Preparation of the calcium derivative of isopropyl acetoacetate*

0.1375 mole of isopropyl acetoacetate together with 80 ccs. of benzene and a 50% theoretical excess of calcium oxide were charged into a flask. The lime partly dissolved with the evolution of heat and after the reaction sad subsided the mixture was refluxed with agitation under a decanter head for a period of two hours. The eliminated water was removed and the benzene solution of the calcium salt filtered to remove unreacted calcium oxide.

*Condensation*

0.125 mole of acetylsalicyl chloride was added over a period of 10–15 minutes to a refluxing solution of the calcium derivative of isopropyl acetoacetate in benzene prepared as above. Precipitation of calcium chloride took place and the mixture was refluxed for a period of two hours. After the reaction was over, the mixture was cooled, 25 ccs. of water added to dissolve the calcium chloride and the aqueous layer then discarded. The benzene was then distilled off and the residue treated with 120 ccs. of 10% weight/volume aqueous sodium hydroxide solution together with 50 ccs. of methyl alcohol. The temperature was held at 0°–5° C., for a period of 2½ hours and then concentrated hydrochloric acid added to neutralise the sodium hydroxide till the final product was acid to bromophenol blue. The precipitated 3-acetyl-4-hydroxycoumarin was filtered off and washed first with water and then with a small amount of methanol. After drying at 70–80° C., the product was weighed. The yield was 71.8% by weight based on isopropyl acetoacetate, and 79% by weight on acetylsalicyl chloride.

EXAMPLE 2

The above example was repeated using a crude preparation of acetylsalicyl chloride containing aluminium trichloride (prepared according to the process of the aforesaid copending application Serial No. 454,635). Substantially the same yield of the coumarin derivative was obtained.

EXAMPLE 3

*Preparation of the calcium derivative of isopropyl acetoacetate*

0.55 mole of isopropyl acetoacetate together with 600 ccs. of benzene and 30% theoretical excess of calcium oxide were charged into a flask. The benzene solution of the calcium derivative of isopropyl acetoacetate was produced by following the procedure outlined in Example 1.

*Condensation*

0.5 mole of acetylsalicyl chloride was added over a period of 10–15 minutes to the refluxing agitated solution of the calcium salt of isopropyl acetoacetate in benzene produced as above. Precipitation of calcium chloride took place and the mixture was refluxed for a period of three hours. After the reaction was over, 100 ccs. of water were added to dissolve the calcium chloride and the aqueous layer then discarded. The benzene was then distilled off and the residue treated with 480 ccs. of 10% weight/volume aqueous sodium hydroxide solution together with 250 ccs. of methyl alcohol. The temperature was held at 20° C. for a period of two hours and then concentrated hydrochloric acid added to neutralise the sodium hydroxide until the final product was acid to bromophenol blue. The precipitated 3-acetyl-4-hydroxycoumarin treated as in Example 1 was obtained in a yield of 70% on the isopropyl acetoacetate. The precipitation of the coumarin derivative was also accomplished using 10% sulphuric acid instead of concentrated hydrochloride acid with substantially identical results.

EXAMPLE 4

*Preparation of the calcium derivative of n-butyl acetoacetate*

0.275 mole of n-butyl acetoacetate together with 150 ccs. of benzene and a 10% theoretical excess of calcium oxide were charged into a flask. From this the calcium salt of n-butyl acetoacetate was prepared according to the procedure of Example 1.

*Condensation*

0.25 mole of acetylsalicyl chloride containing aluminium trichloride (prepared according to copending application Serial No. 454,635, referred to above) was then added over a period of 10–15 minutes to the refluxing agitated solution of the calcium salt of n-butyl acetoacetate prepared as above. Precipitation of calcium chloride took place and the mixture was refluxed for a period of three hours. After the reaction was over the mixture was cooled, 50 ccs. of water added to dissolve the calcium chloride and the aqueous layer then discarded. The benzene was distilled off and the residue treated with 220 ccs. of 10% weight/volume aqueous sodium hydroxide solution. The temperature was held at 20° C. for a period of two hours and then concentrated hydrochloric acid was added to neutralise the sodium hydroxide till the final product was acid to bromophenol blue. The precipitated 3-acetyl-4-hydroxycoumarin was filtered off and washed first with water and then with a small amount of methanol. After drying at 70–80° C., the product was weighed. The yield was 69.5% based on n-butyl acetoacetate.

EXAMPLE 5

*Preparation of the calcium derivative of n-butyl acetoacetate*

0.55 mole of n-butyl acetoacetate together with 300 ccs. of benzene and a 20% theoretical excess of calcium oxide were charged into a flask. The n-butyl acetoacetate was a crude undistilled preparation prepared by reacting n-butanol with diketene in the presence of a trimethylamine catalyst. The benzene solution of the calcium salt of n-butyl acetoacetate was prepared from this by following the procedure of Example 1.

*Condensation*

0.5 mole of crude acetylsalicyl chloride containing aluminium trichloride (prepared according to copending application Serial No. 454,635 referred to above) was added over a period of 10–15 minutes to the refluxing agitated solution of the calcium salt of n-butyl acetoacetate in benzene prepared as above. Precipitation of calcium chloride took place and the mixture was refluxed for a period of two hours. After the reaction was over the mixture was cooled, 100 ccs. of water added to dissolve the calcium chloride and the aqueous layer then discarded. The benzene was distilled off and the residue treated with 440 ccs. of 10% weight/volume aqueous sodium hydroxide solution. The temperature was held at 20° C. for a period of two hours and then concentrated hydrochloric acid was added to neutralise the sodium hydroxide till the final product was acid to bromophenol blue. The yield of 3-acetyl-4-hydroxycoumarin was 66.4% based on the n-butyl acetoacetate.

EXAMPLE 6

The procedure of the last example was repeated except that the calcium derivative of the n-butyl acetoacetate was prepared in carbon tetrachloride instead of in benzene.

The condensation reaction was also carried out in carbon tetrachloride. A 68.2% yield of the coumarin derivative based on n-butyl acetoacetate, was obtained.

I claim:
1. A process for the production of 3-acetyl-4-hydroxy-coumarin which comprises refluxing in an inert organic solvent boiling between 50° and 100° C. acetylsalicylyl chloride with a molar excess of at least 10% and not more than 20% of a pre- and separately-formed reactant consisting of the calcium derivative of an acetoacetic ester of an alkanol containing from three to six carbon atoms per molecule, said alkanol having at least one hydrogen atom directly attached to the carbon atom carrying the hydroxy group, cyclising the resulting intermediate compound with aqueous alkali metal hydroxide solution, and liberating the 3-acetyl-4-hydroxy-coumarin from the resulting alkali metal salt by acidification.

2. A process according to claim 1, wherein the alkanol is isopropanol.

3. A process according to claim 1, wherein the alkanol is n-butanol.

4. A process according to claim 1, wherein the reaction mixture resulting from the cyclisation is acidified directly to produce the 3-acetyl-4-hydroxy-coumarin.

References Cited in the file of this patent

UNITED STATES PATENTS 2,449,038    Hultquist _____ Sept. 7, 1948

FOREIGN PATENTS 102,746    Germany _____ Mar. 11, 1899

OTHER REFERENCES

Anschutz: Annalen 367, pages 193–194 (1909).